May 25, 1937.  E. J. KLOPFENSTEIN  2,081,239
FLUID ACTUATED INTERMITTER
Filed July 23, 1934
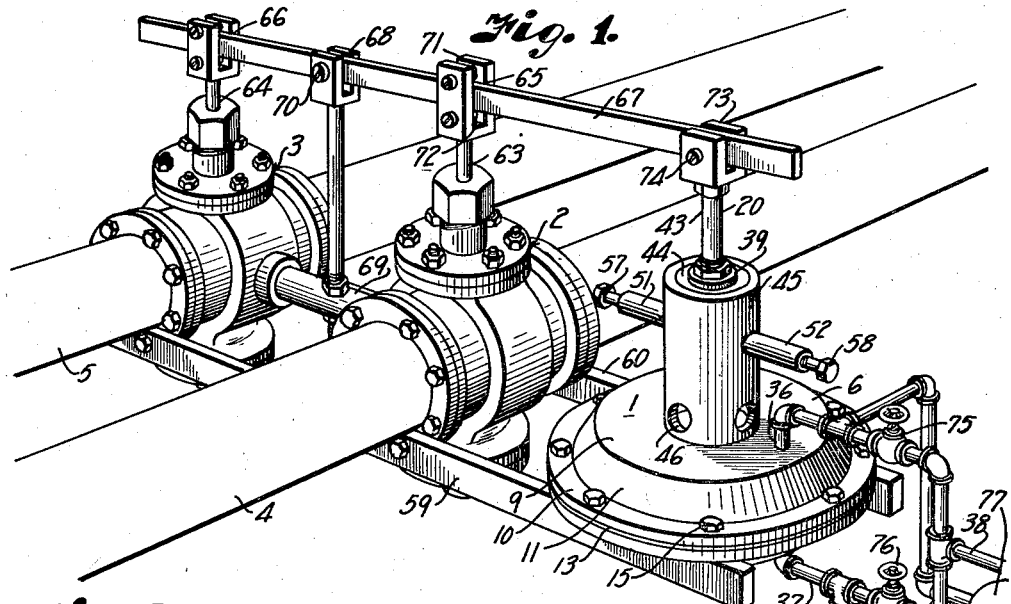
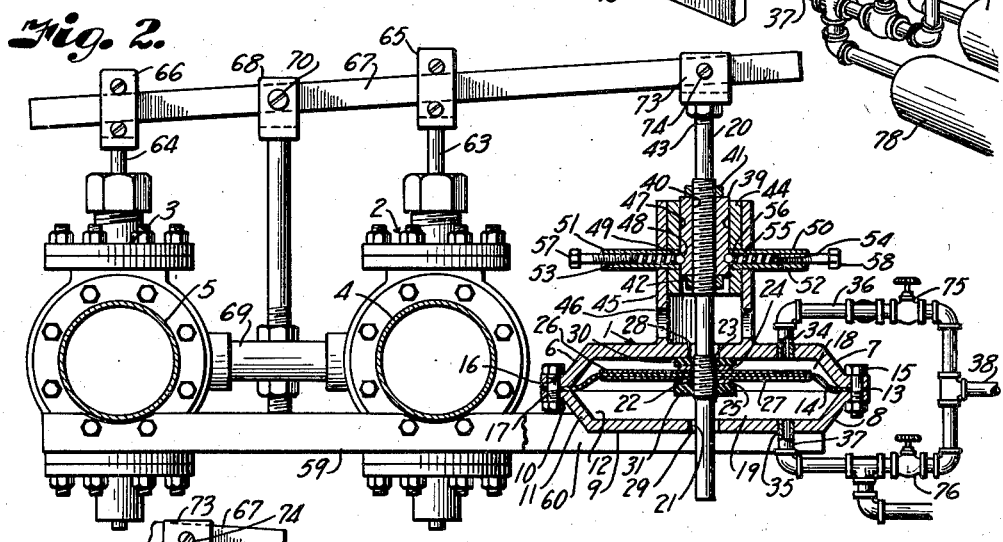
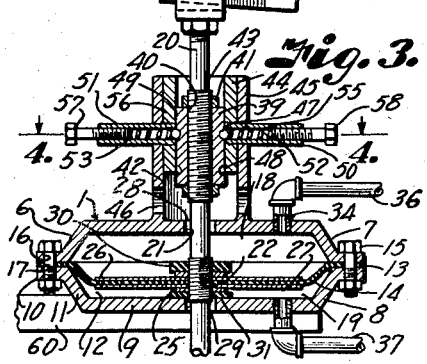
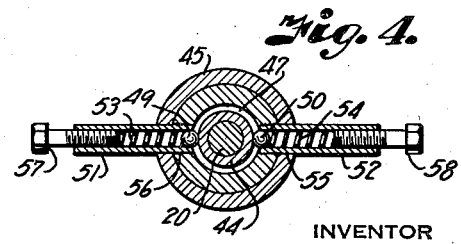
INVENTOR
Edward J. Klopfenstein.
BY
Arthur E. Brown
ATTORNEY Patented May 25, 1937

2,081,239

UNITED STATES PATENT OFFICE 2,081,239

FLUID ACTUATED INTERMITTER

Edward J. Klopfenstein, Oklahoma City, Okla., assignor of one-half to Indian Territory Illuminating Oil Company, Bartlesville, Okla., a corporation of New Jersey Application July 23, 1934, Serial No. 736,552

6 Claims. (Cl. 121—48)

This invention relates to a fluid actuated intermitter, and more particularly to one of the reciprocatory type for intermittently operating a valve or like mechanism, and has for its principal object to provide for functioning of the intermitter mechanism at definite time intervals.

Other important objects of the invention are to provide adjustment of the time intervals at which the mechanism is at rest, to effect snap-action of the intermitter by releasing and controlling the actuating fluid under influence of a latching mechanism, to provide adjustment of the latching mechanism for adapting the intermitter to different pressures of the actuating fluid, and to provide differential time intervals between successive operations of the intermitter.

It is also an important object of the invention to effect alternate intermittent operation of two or more valves or equivalent devices to which the intermitter is attached.

In accomplishing these and other objects of the invention I have provided improved details of structure, the preferred form of which is illustrated in the accompanying drawing, wherein:

Fig. 1 is a perspective view of a fluid actuated intermitter mechanism embodying the features of the present invention and arranged for effecting alternate opening and closing of a pair of valves at definite time intervals.

Fig. 2 is a vertical section through the mechanism illustrated in Fig. 1, showing the operating mechanism in one position of its movement after effecting opening of one of the valves and closing of the other.

Fig. 3 is a similar view of the intermitter mechanism showing the operating position thereof when the valves are reversely operated.

Fig. 4 is a cross section through the latching mechanism on the line 4—4, Fig. 3.

Referring more in detail to the drawing:

1 designates an intermitter embodying the features of the present invention and in the illustrated instance is utilized for intermittently and alternately opening and closing the valves 2 and 3 in a pair of pipe lines 4 and 5, which deliver a pressure medium, such as compressed air, for effecting flow of oil wells to which the lines are respectively connected.

The operating mechanism includes a housing 6 comprising mated sections 7 and 8, each consisting of a disk-shaped wall portion 9 having an annular flange portion 10 offset therefrom by an annular connecting wall 11 to form a recess 12. The flanges 10 are arranged in face to face relation to clamp the peripheral edge 13 of a flexible diaphragm 14 therebetween when the sections are secured together by fastening devices 15 extended through openings 16 in the flanges and through corresponding openings 17 in the diaphragm, as shown in Fig. 2. The recesses 12 in the respective sections thus form separate closed chambers 18 and 19 on the respective sides of the diaphragm and into which the diaphragm is made to alternately flex when greater pressure is applied in one chamber than the other, thereby effecting operation of a trip rod 20, as now to be described.

The trip rod 20 extends through openings 21 located axially in the disk portions 9 of the respective housing sections and through an aligning opening 22 in the center of the diaphragm. The portion of the rod extending through the diaphragm is threaded as at 23 to mount nuts 24 and 25 which clampingly engage the opposite sides of the diaphragm to secure the rod thereto so that when the diaphragm is moved into and from the respective chambers the rod will be reciprocated thereby. The points of attachment of the rod and sides of the diaphragm are preferably reinforced by disk-like washers 26 and 27 sleeved on the rod ahead of the nuts and in supporting engagement with the opposite faces of the diaphragm. The rod 20 extends loosely through the openings 21 to form annular ports 28 and 29 through which the respective chambers are vented to atmosphere, as later described.

In order to control flow from the chambers through the annular ports the rod carries valve disks 30 and 31 preferably formed of compressible material and of suitable diameter to close the ports when the valves engage the respective inner faces of the disk portions of the respective sections.

To admit a pressure fluid into the respective chambers, the housing sections are provided with openings 34 and 35 into which are threaded the terminal branches 36 and 37 of a supply pipe 38 which delivers the fluid from a source of supply of constant pressure (not shown) to the respective branches and through the branches to the respective chambers. The branches have less flow capacity than the ports 28 and 29 to provide venting of the chambers when the ports are opened, as later described.

With the construction thus far described and with the flow through the branches being equal, the pressure on opposite sides of the diaphragm will become equalized and the fluid upon flowing into the chambers will flow directly to atmosphere through the annular ports. However, I provide means for yieldingly holding the rod to effect snap action of the diaphragm whereby either one or the other of the ports is normally closed by its valve disk 30 or 31, as the case may be, so that pressure is built up on that side of the diaphragm to cause movement of the diaphragm in the opposite direction to close the opposite port. For example, if the rod is yieldingly held so that the valve disk 30 closes the annular port 28 in the chamber 18, fluid flowing into the chamber 19 will be vented through the port and no pressure will accumulate therein. However, when the pressure is built up sufficiently in the chamber 18 to resist the holding pressure applied to the rod, the diaphragm will be moved thereby until the valve disk 31 closes the port 29 to allow pressure to accumulate in the chamber 19 and exhaust from the chamber 18.

Since the release of the holding means is suddenly and completely effected, the momentum of the rod and expansion of compressed fluid produces snap movement of the diaphragm and rapid opening and closing of the ports, which prevents equalization of pressures in the respective chambers that would stop actuation of the intermitter.

The holding means includes a latch block 39 having an opening 40 therethrough to pass the rod 20 which is adjustably secured thereto by lock nuts 41 and 42 threaded on the projecting end 43 of the rod and engaging the opposite ends of the block.

The latch block has sliding fit within a guide sleeve 44 that is pressed within a tubular boss 45 extending upwardly from the housing section 7, the lower end of which has port openings 46 to vent the pressure fluid that escapes through the port 28 to atmosphere. The latch block has a pair of grooves 47 and 48 that are spaced apart a distance equal to travel of the rod which, of course, is governed by seating contact of the valves 30 and 31 over the annular ports 28 and 29. While the latch block may be of any shape, it is preferably of cylindrical form with the grooves extending circumferentially thereof, as shown in Fig. 2, whereby they may be engaged by latch balls 49 and 50 positioned on opposite diametrical sides of the block.

The latch balls are normally retained in one or the other of the grooves by means of springs 51 and 52 that are housed within tubes 53 and 54 projected through openings 55 in the tubular boss 45 and have their inner ends threaded into aligning openings 56 in the guide sleeve. The outer ends of the tubes are internally threaded to accommodate adjusting screws 57 and 58 having their ends bearing against the springs to adjust tension thereof whereby the holding power of the latch balls is varied to correspond with the pressure of the fluid delivered through the pipe 38.

In order to mount the actuating mechanism in operative relation with the valves 2 and 3 a pair of bars 59 and 60 are secured to the housing section 8 and have laterally extending spaced ends respectively secured to the opposite ends of the valve housings, as shown in Fig. 1.

The valves 2, 3 may be of any suitable type but have reciprocable valve stems 63 and 64 carrying slotted heads 65 and 66 for seating a common operating lever 67 therein and which is pivotally mounted on a standard 68 having its lower end carried on a bridge 69 connecting the valve housings, the lever being connected to the standard by a pivot screw 70. In order that the lever may rock on its fulcrum 70 and still allow vertical movement of the valve stems, the ends of the lever are loosely mounted in the slots of the heads 65 and 66 between pairs of rollers 71 and 72 engaging the upper and lower edges thereof, as clearly shown in Fig. 1. The outer end of the lever extends laterally from the valves and connects with a slotted head 73 on the end 43 of the rod 20 by means of a pin and slot connection 74.

In air flowing of oil or like wells the fluid from the producing sand is flowed, usually under well pressure, into a receiver that is located adjacent the bottom of the well. When a load or quantity of well fluid is in the receiver, the air is delivered thereto through one of the pipes 4 or 5 to blow or flow the load of liquid under displacement pressure to the top of the well. At the time the receiver is emptied, the flow of air is shut off to allow refilling of the receiver before the air pressure is again applied.

It is thus apparent that the valves must be opened and closed in conformity to the flow of well fluid to and from the respective receivers; that is, the air supply valve must remain closed until the receiver for that well is filled, and then it must remain open until the load is discharged.

It is, therefore, necessary to adjust the intervals of rest at the respective functions of the intermitter to correspond with the respective flows of the well fluid. This is accomplished by controlling the rate of flow of the pressure fluid into the respective chambers 18 and 19. By controlling the rate of flow I am enabled to accurately time the period required for the pressure in the chambers to overcome the resistance of the latching means and thereby regulate the length of the rest periods of the intermitter and the time the valves 2 and 3 are open and closed.

In controlling the rate of flow I preferably provide the branches 36 and 37 with control valves 75 and 76 respectively, whereby the flow velocity therethrough may be selectively restricted to prolong the time required in overcoming the resistance of the latch means. In order to increase the length of the rest periods and also to provide a smoother operating mechanism in case of fluctuation of the pressure in the pipe 38, the branch pipes 36 and 37 are each connected at a point between the valves 75 and 76 and the corresponding chambers 18 and 19 with accumulator tanks 77 and 78 which, in effect, increase the capacity of the respective chambers so that the pressure must also be alternately built up and lowered in the respective accumulators as well as in the chambers to effect movements of the intermitter.

In operating an intermitter constructed and assembled as described, the screws 57 and 58 are adjusted to tension the springs for effecting the desired resistance of the latching mechanism to retain, for example, the valve disk 30 in closing relation with the port 28. When this port is closed the latch balls are engaging in the lower groove 48 and the lever is supported in position to retain the valve 3 closed and the valve 2 open whereby air is cut off in the pipe 4 and flowing in the pipe 5. The well served by the pipe 5 is therefore flowing oil from its receiver and the receiver in the well served by the pipe 4 is in the act of filling. The valves 75 and 76 are then opened to allow flow of pressure fluid through the branches 36 and 37 to the chambers 18 and 19.

Since the port 29 is open, the fluid flowing to that chamber will be vented therethrough to atmosphere and no pressure can build up within the chamber 19, but since the port 28 is closed, pressure will be established in the chamber 18 up to the maximum pressure of the fluid in the line 38. However, the springs are so tensioned that before this pressure is reached, the latch balls yield to free the rod 20. Immediately upon freeing of the rod, the pressure fluid in the chamber 18 acts to drive the diaphragm into the chamber 19 to close the port 29 and open the port 28. Upon this movement of the rod the lever acts to close the valve 2 so that flow of air is cut off to the well served by the pipe 5 wherein the receiver was being emptied and to open the valve 3, admitting flow to the receiver in the other well which had been filling. When the valve disk 31 has closed the port 29, the balls will have engaged in the upper groove 47 to latch the rod in that position.

Pressure which has accumulated in the chamber 18 will exhaust to atmosphere through the port 28 and openings 46 for the reason that the flow capacity of the port 28 is greater than the flow capacity of the branch pipe 36 and the pressure fluid will therefore leak from the chamber faster than it can be admitted thereto. However, pressure will accumulate in the chamber 19 due to closing of port 29 and when the pressure overcomes the resitance of the latch mechanism, the intermitter rod will be reciprocated in the opposite direction, completing one cycle of operation.

It is apparent that the cycle of operations will be continuous as long as pressure fluid is supplied to the respective chambers with definite periods of rest between operations, depending upon the setting of the valves 75 and 76. Should the intermitter not be operating in synchronism with the required flow periods of the wells, the valves 75 and 76 may be readjusted to give the desired timing.

While I have described the intermitter as associated with two alternately operated valves, it is obvious that the valves may be arranged to open and close together by rearranging the fulcrum point of the lever 67. It is further obvious that the intermitter may be used to operate one or a greater number of valves and that the period during which the valves are open may be made differential from the period that they are closed by simply differentially adjusting the valves 75 and 76 so that the flow velocities in the respective branches are such as to require a longer time in establishing pressure in one of the chambers than the other.

From the foregoing it is apparent that I have provided an intermitter mechanism which is positive in operation and whereby definite time periods may be readily established between the respective operations thereof.

What I claim and desire to secure by Letters Patent is:

1. A device of the character described including a diaphragm housing, a diaphragm dividing the housing into separate chambers having aligned outlet ports, a reciprocating member movable through said ports and connected with the diaphragm, valve members on the reciprocating member for successively opening and closing said ports to control outlet of a pressure medium from said chambers, means for admitting a pressure medium to the chambers to pulsate the diaphragm, and means for resisting movement of said reciprocating member to establish definite rest periods between reciprocations of the reciprocating member.

2. A device of the character described including a diaphragm housing, a diaphragm dividing the housing into separate chambers having aligned outlet ports, a reciprocating member movable in the housing and having fixed connection with the diaphragm, valve members carried by and movable directly with the reciprocating member for successively opening and closing said ports to control outlet of a pressure medium from said chambers, means for admitting a pressure medium to the chambers to pulsate the diaphragm, means resisting movement of said reciprocating member to establish definite rest periods for said member, and means for regulating velocity of the pressure medium to adjust length of said rest periods.

3. A device of the character described including a diaphragm housing, a diaphragm dividing the housing into separate chambers having aligned outlet ports, a reciprocating member movable through said ports and connected with the diaphragm, valve members on the reciprocating member for successively opening and closing said ports to control outlet of a pressure medium from said chambers, means for admitting a pressure medium to the chambers to pulsate the diaphragm, means for resisting movement of said reciprocating member to establish definite rest periods between reciprocations of the reciprocating member, and means for regulating velocity of the pressure medium to adjust length of said rest periods.

4. A device of the character described including a housing having ports in opposite portions thereof, a diaphragm dividing the housing into separate chambers, each having outlet through one of said ports, a pressure medium supply line having branches leading to respective chambers in the housing, valve members movable with the diaphragm to respectively open and close said ports in response to accumulation of pressure medium in the closed chamber, and means connected in each of the respective branches for regulating rate of supply of the pressure medium to said chambers.

5. A device of the character described including a housing having ports in opposite portions thereof, a diaphragm dividing the housing into separate chambers, each having outlet through one of said ports, a pressure medium supply line having branches leading to respective chambers in the housing, valve means movable with the diaphragm to respectively open and close said ports in response to accumulation of pressure medium in the closed chamber, means connected with said chamber for accumulating pressure medium from said branches, and means for regulating frequency of shift of the diaphragm according to volume of pressure medium in a closed chamber and said accumulating means.

6. A device of the character described including a housing having ports in opposite portions thereof, a diaphragm dividing the housing into separate chambers, each having outlet through one of said ports, a pressure medium supply line having branches leading to respective chambers in the housing, valve means movable with the diaphragm to respectively open and close said ports in response to accumulation of pressure medium in the closed chamber, separate means connected with each of said chambers for accumulating pressure medium from a corresponding branch, and means for regulating frequency of shift of the diaphragm according to volume of pressure medium in a closed chamber and its accumulating means.

EDWARD J. KLOPFENSTEIN.